2,723,182

Patented Nov. 8, 1955

2,723,182

METHOD OF PRODUCING ALKALI METAL TITANIUM DOUBLE FLUORIDES IN WHICH THE TITANIUM HAS A VALENCE OF LESS THAN FOUR

Merle E. Sibert, Euclid, and Quentin H. McKenna, Cleveland, Ohio, assignors to Horizons Titanium Corporation, Princeton, N. J., a corporation of New Jersey No Drawing. Application September 9, 1954, Serial No. 455,068

7 Claims. (Cl. 23—88)

This invention relates to a method for preparing lower valent titanium fluorides. More particularly, it relates to a method for preparing from titanium oxides complex alkali metal titanium fluorides in which the titanium has a valence of less than four.

Lower valent titanium halides, and in particular lower valent titanium fluorides, are useful for many purposes including the production of titanium metal by thermal and electrolytic processes of potentially great commercial importance. Procedures heretofore proposed for the preparation of lower valent titanium fluorides have employed as starting materials titanium-containing compounds such as tetra-valent titanium fluorides and carbides which are converted into the desired lower valent titanium fluorides by electrolytic or thermal procedures. However, attempts in the past to convert the relatively plentiful and inexpensive titanium oxides into lower valent titanium fluorides by reaction with fluoride compounds have not met with success.

We have now found that it is possible to prepare lower valent titanium fluorides directly from titanium oxides by a simple thermal reaction between these titanium oxides, carbon and an alkali metal fluotitanate. In our process an intimate mixture of titanium oxide and carbon is reacted with sodium, potassium or lithium fluotitanate by heating these reactants to a temperature within a range of about 780° to about 1150° C. under an inert atmosphere with respect to said reactants. Alkali metal chlorides, i. e. sodium, potassium or lithium chlorides, may be included in the reaction mixture as diluent salts. An alkali metal titanium double fluoride in which the titanium has a valence of less than four is formed as a result of the reaction. The alkali metal titanium double fluoride product may be recovered from the reaction residue either by aqueous separation techniques or in the form of a molten bath of the product salt which has been filtered to free it of solid contaminants.

The alkali metal fluotitanates useful in the practice of our invention include sodium fluotitanate, potassium fluotitanate and lithium fluotitanate. In order to avoid undesirable side reactions and possible contamination of the product, the fluotitanate employed should be of recrystallized quality. That is to say, the fluotitanate should be substantially free of silica and metallic impurities and should contain less than about .01% water and .01% insolubles. Because of the relative cheapness and availability of potassium fluotitanate, we presently prefer to use this fluotitanate in our process. Therefore, in the interest of simplicity, our invention will be described in connection with the use of potassium fluotitanate as a representative of all metal alkali fluotitanates. However, it should be kept in mind that what is said with respect to potassium fluotitanate applies equally to the other alkali metal fluotitanates. Moreover, although the use of diluent alkali metal chlorides may not be specifically set forth, all reaction mixtures hereinafter referred to may contain as diluents alkali metal chlorides up to an amount equal molecularly to about the amount of alkali fluotitanate employed. Substantially chemically pure sodium, potassium and lithium chlorides suitable for use as diluents are available commercially. The alkali metal fluorides are not desirable diluents in the reaction mixture because of their ability to dissolve titanium oxides with the resulting formation of titanium oxy-fluorides. Bromides and iodides of the alkali metals do not dissolve titanium oxides but these halides form unstable titanium bromides and iodides which decompose or disproportionate at high temperatures to evolve tetra-bromides and tetra-iodides of titanium.

The titanium oxides employed in our process include titanium dioxide, titanium sesquioxide and titanium monoxide. These oxides should be very finely divided, of the order of about minus 325 mesh (Tyler Standard), and should be as pure as it is possible to obtain, particularly with regard to silica and metallic impurities which dissolve in potassium fluotitanate. Titanium dioxide of a purity satisfactory for use in our process is obtainable commercially and hereinafter will be referred to as "pigment grade" titanium dioxide. Titanium sesquioxide and titanium monooxide of a purity satisfactory for use in our process may be prepared by the processes described in the copending applications of Sibert and Carlton, Ser. Nos. 289,878, 289,879 and 289,880, filed May 24, 1952, now United States Patents Numbered 2,681,849, 2,681,850 and 2,681,851, respectively.

The carbon employed should also be very pure and very finely divided. A suitable source of carbon is lampblack which has been calcined at a temperature of at least 1500° C. in at high vacuum prior to mixing it with the other reactants.

The finely divided titanium oxide and carbon are intimately mixed together and preferably are then compressed into dense pellets prior to reaction with the potassium fluotitanate. The amount of carbon which should be present in the mixture is such that there is one atom of carbon for each atom of oxygen in the titanium oxide compound, and an additional atom of carbon for each atom of titanium in the titanium oxide compound. The mixture of titanium oxide and carbon reacts with the potassium fluotitanate under the conditions of our process to produce complex potassium and titanium fluorides in which the titanium has a valence less than four.

Theoretically, when preparing a trivalent titanium fluoride, there should be three mols of potassium fluotitanate present in the reaction mixture for each mol of titanium present in the titanium oxide reactant. When it is desired to prepare divalent titanium fluorides, correspondingly less amounts of potassium fluotitanate are needed in the reaction mixture. However, we have found in practice that the reaction between titanium oxide, carbon and potassium fluotitanate does not go to theoretical completion, due to incomplete reaction or to the formation of minor amounts of subsidiary reaction products such as titanium carbide or oxyfluoride. Therefore, to avoid the presence of unreduced potassium fluotitanate in the product, we have found it advisable to use an excess of the titanium oxide and carbon reactants.

The reaction between the titanium oxide, carbon and potassium fluotitanate is carried out by bringing the intimate mixture of titanium oxide and carbon into contact with potassium fluotitanate in an atmosphere inert with respect to the reactants at a temperature above the melting point of the fluotitanate but below that at which the resulting lower valent complex titanium salts decompose or disproportionate. The reaction will proceed to some extent just above the melting point 772° C. of pure potassium fluotitanate and is accelerated with increasing temperature. However, at temperatures of about 1200° C. or higher excessive decomposition and disproportionation are encountered. Accordingly, a temperature within the range of about 780° to 1150° C. and preferably within the range of about 780° to 1100° C. is useful in the practice of our invention. Within this range temperatures between about 780° to 900° C. result in the formation of trivalent alkali metal titanium fluorides, while temperatures in excess of about 900° C. favor the formation of divalent titanium fluorides.

It is essential that the reaction be carried out in an atmosphere that is inert to the reactants. The presence of even a trace amount of oxygen or moisture in the atmosphere will result in contamination and serious loss in yield of the desired product due to the formation of oxyfluorides. Moreover, the reaction is accompanied by the evolution of carbon monoxide from the reaction mixture. Therefore, we have found it advisable to conduct the reaction in an actively pumping vacuum, or in an atmosphere composed of a dry monatomic gas, such as argon, which is continuously cycled through the reaction chamber to withdraw evolved carbon monoxide therefrom. With the establishment of such an inert atmosphere, the following equations are representative of the over-all reactions occurring between the titanium oxide, carbon, and potassium fluotitanate reactants at the temperature ranges indicated.

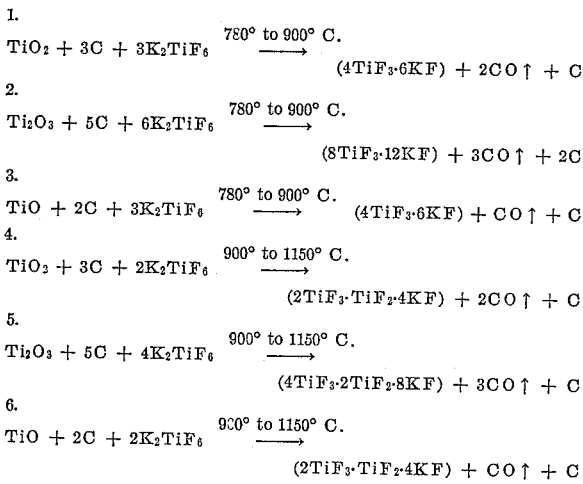

1.
$$TiO_2 + 3C + 3K_2TiF_6 \xrightarrow{780° \text{ to } 900° \text{ C.}} (4TiF_3 \cdot 6KF) + 2CO\uparrow + C$$

2.
$$Ti_2O_3 + 5C + 6K_2TiF_6 \xrightarrow{780° \text{ to } 900° \text{ C.}} (8TiF_3 \cdot 12KF) + 3CO\uparrow + 2C$$

3.
$$TiO + 2C + 3K_2TiF_6 \xrightarrow{780° \text{ to } 900° \text{ C.}} (4TiF_3 \cdot 6KF) + CO\uparrow + C$$

4.
$$TiO_2 + 3C + 2K_2TiF_6 \xrightarrow{900° \text{ to } 1150° \text{ C.}} (2TiF_3 \cdot TiF_2 \cdot 4KF) + 2CO\uparrow + C$$

5.
$$Ti_2O_3 + 5C + 4K_2TiF_6 \xrightarrow{900° \text{ to } 1150° \text{ C.}} (4TiF_3 \cdot 2TiF_2 \cdot 8KF) + 3CO\uparrow + C$$

6.
$$TiO + 2C + 2K_2TiF_6 \xrightarrow{900° \text{ to } 1150° \text{ C.}} (2TiF_3 \cdot TiF_2 \cdot 4KF) + CO\uparrow + C$$

Not only must the titanium oxide and carbon reactants be very pure and finely divided but they also must be in intimate contact with each other. Accordingly, we have found that the best results are obtained by first thoroughly blending the titanium oxide and carbon reactants together until an intimate physical mixture is obtained, and by then compressing this mixture with great force into individual pellets. Suitable pellets can be prepared by mixing a small amount, say about 1 to 2%, of water-soluble methyl cellulose with the blend of titanium oxide and carbon reactants to which mixture there is then added sufficient water to serve as a vehicle for the methyl cellulose. The moistened blend is formed into pellets approximately one inch in diameter by means of a mechanical press capable of exerting about 20 tons' pressure. The titanium oxide and carbon pellets thus formed should be thoroughly dried at a temperature of about 150° C. for 8 to 10 hours in order to remove from the pellets all of the water initially used to moisten them.

The pelleted mixture of titanium oxide and carbon is added to a measured quantity of potassium fluotitanate contained in a suitable reaction vessel. The reaction vessel is advantageously a graphite crucible or some similar container that is inert to the reactants at the temperatures encountered in our process. The charged reaction vessel is then placed in a furnace in which an inert atmosphere can be maintained.

Any suitable inert atmosphere furnace may be used for carrying out the process of our invention. One such furnace construction comprises a steel pot having an open top which can be sealed with a gas-tight lid. Advantageously, the steel pot is internally insulated with a refractory silicious powder held in place against the walls of the pot by means of a graphite liner. An internal heating element is provided, advantageously comprising a graphite resistance element adapted to surround the graphite reaction vessel. The graphite reaction vessel containing the reactants is disposed within the graphite resistance element which, in turn, is centrally positioned in the insulated pot. The necessary electrical connections to the heating element, and the necessary valves and inlet and outlet pipes for the establishment of the inert atmosphere within the furnace, are provided in a gas-tight lid of the steel pot.

To establish an inert atmosphere in the furnace, we presently prefer first to evacuate all of the air from within the furnace, and then to introduce dry argon gas into the furnace, repeating the cycle of evacuation of the atmosphere and replacement with argon gas at least two times. After flushing out the interior of the furnace in this manner, a flow of dry pure argon gas into and out of the furnace is established in order to sweep from the atmosphere in the furnace any carbon monoxide evolved from the reactants in the course of the reaction.

The reactants are heated in an inert atmosphere. A furnace such as that described is used to bring the reactants up to a reaction temperature within the range of about 780° to 1150° C. The reactants are held at this reaction temperature for a period of time sufficient to insure that the reaction has gone as close to theoretical completion as the reaction conditions permit. The time required for substantial completion of the reaction depends upon the density and the size of the pellets of titanium oxide and carbon, as well as upon the temperature of the reactants. A reaction time of from five to ten hours is usually sufficient with pellets prepared as described hereinabove.

On completion of the reaction, the furnace is allowed to cool and the solidified salt cake is recovered from the crucible removed therefrom. The solidified salt cake recovered from the crucible is reddish brown to greyish lavender in color and may contain, besides the lower valent titanium fluorides produced by the reaction, carbon and unreacted titanium oxide, unreduced normal potassium fluotitanate, diluent alkali metal chlorides and any carbides and oxyfluorides that may have formed in the course of the reaction. The lower valent titanium fluoride product can be recovered from the reaction residue by wet chemical treatment or by filtration of the molten salt mass to remove insolubles.

The recovery of the lower valent titanium product by aqueous procedures is limited in practice to trivalent titanium fluorides. The product salt cake is first crushed to a fine powder and then is leached with cold dilute hydrochloric acid to dissolve the complex potassium salts of lower valent titanium fluorides which are soluble therein, leaving undissolved any residual carbon, titanium oxide, potassium fluotitanate, carbides and oxyfluorides. A clear green liquor (characteristic of trivalent titanium solutions) is obtained as the result of the leaching operation, and this liquor is thereupon filtered to remove all insoluble matter. A saturated solution of sodium fluoride is added to the green filtrate while stirring the filtrate until the color changes permanently from green to brownish violet. The solution is then warmed gently (i. e. to a temperature of about 40° to 50° C.) whereupon tannish lavender crystals precipitate out of the solution leaving a violet colored supernatant liquid. The precipitated crystals are recovered by filtering the liquid, and the violet filtrate is again treated with a saturated solution of sodium fluoride. Upon addition of the sodium fluoride solution with stirring, the violet solution gradually becomes substantially colorless at which point a slight turbidity develops. Gentle warming causes tannish violet colored crystals to precipitate from the solution leaving a water white supernatant liquid. The second batch of precipitated crystals are recovered by filtration and both batches are then washed with distilled water and dried at 105° C.

Although the exact structures of the complex lower valent titanium fluorides are not known with certainty, it has been found that the sodium fluoride derivatives obtained as the first and second precipitates from the green liquor have completely different X-ray patterns, apparently indicative of different sodium fluoride and potassium fluoride contents. However, irrespective of their precise structure, the lower valent titanium fluoride products obtained by the practice of our invention are free from titanium dioxide, titanium carbide, potassium fluotitanate, and normal sodium and potassium fluorides and chlorides. These reduced titanium products are therefore available for subsequent use in a highly pure state.

When the lower valent titanium fluoride product is recovered by filtration of the fused reaction residue, the fused salt mass is filtered through a porous graphite or carbon filter, thus separating the molten salt from any residual carbon, carbides, titanium oxide and oxyfluorides. The resulting fused salt may then be used directly or in admixture with additional diluent alkali metal chlorides in electrolytic processes for the production of titanium metal. The fused salt bath filtration procedure is particularly valuable in the preparation of divalent titanium fluorides, or mixtures of divalent and trivalent titanium fluorides. Divalent titanium fluoride is not generally amenable to aqueous treatment due to the strong reducing properties of divalent titanium salts. Heavy losses in yield can be expected even in highly buffered solutions. Accordingly it is preferable to recover the titanium difluoride containing product in the form of a fused salt bath in which the divalent titanium is present either in simple or complex difluoride compounds.

The titanium difluoride and trifluoride products of our process are useful for a variety of purposes including commercially important processes for the preparation of titanium metal.

The following examples are illustrative but not limitative of the practice of our invention:

*Example I*

A mixture of 798 parts by weight of pure pigment grade titanium dioxide and 360 parts by weight of pure calcined lampblack were blended together. After thorough blending, 20 parts by weight of water-soluble methyl cellulose and enough distilled water to slightly dampen the mixture was added and thoroughly blended with the mixture. The final moist mixture was pressed into pellets one-half inch high and one inch in diameter in a steel die by means of a press exerting 20 tons of force and the pellets thus formed were dried at 150° C. for 10 hours. The dried pellets weighed 1047 parts by weight and had an average density of 2.4 grams per cc. All of the pellets were placed in a graphite crucible along with 7920 parts by weight of dry recrystallized potassium fluotitanate. The graphite crucible was heated to a temperature of 845° C. in an inert atmosphere furnace in which a continuously changing argon atmosphere had been established. The reaction temperature was maintained for 4 hours whereupon the furnace was allowed to cool. The resulting salt product was a salt cake having a light reddish brown color. The pellets were still evident but were rather soft and dark grey in color.

The salt product was ground to a fine powder which was found to weigh 8000 parts by weight. A small sample of the ground powder was analyzed and was found to contain 21.6% titanium. As pure potassium fluotitanate contains 19.9% titanium, the salt product had gained 1.7% in its titanium content, representing a gain of 135 parts by weight of titanium in the final ground salt product contributed thereto by the titanium dioxide and carbon pellets. If the thermal reaction represented by Equation 1 had gone to 100% completion, there would have been a gain of 479 parts by weight of titanium in the final salt product, on the basis of the 798 parts by weight of titanium dioxide in the initial charge mixture. The actual percentage yield, therefore, which is determined by dividing the actual yield (135 parts by weight) by the theoretical yield (479 parts by weight) and multiplying the result by 100, is 28.2%.

A portion of the ground reddish brown salt product weighing 100 grams was slurried in 500 ml. of a cold 3% solution of hydrochloric acid and the slurry was stirred for one hour. At the end of this time the material that dissolved in the dilute acid solution had formed a clear green liquor which was filtered to remove insolubles therefrom. A saturated solution of sodium fluoride was then added slowly to the clear green filtrate, while stirring the filtrate, until the color changed permanently from green to brownish violet. The violet liquor was then warmed to 40° C. whereupon a lavender precipitate settled out. Heating was continued until the temperature of the solution reached 90° C. to keep dissolved and unreacted potassium fluotitanate in solution. The hot aqeuous slurry was then filtered to recover the insoluble lavender crystals. To the clear lavender filtrate an additional amount of the saturated solution of sodium fluoride was added until the liquor became nearly colorless and a slight turbidity developed. The solution was again warmed to 40° C. whereupon a lavender precipitate again settled out leaving a water white supernatant liquid. Both batches of fine violet crystals were then washed with distilled water and dried at 105° C. for 2 hours. The reducing properties of the dry lavender crystals indicated that lower valent titanium was present.

It should be pointed out that both the insoluble residue from the initial cold hydrochloric acid leaching step and the final filtrate from the titanium fluoride precipitation step contained some unreacted potassium fluotitanate. This material can be recovered from the insoluble residue by hot water leaching, and from the leach liquor and the final filtrate by evaporation and concentration operations. Thus, unreacted potassium fluotitanate is recoverable and can be dried and recycled through the process. After recovery of the unreacted potassium fluotitanate from the insoluble residue, the remaining titanium content thereof, made up of titanium oxides and oxyfluorides, is best recovered by digesting the residue in sulphuric acid. The resulting sulfate solution is diluted, filtered to remove free carbon and other insolubles, and is neutralized to precipitate titanium dioxide.

*Example II*

A mixture of 111 parts by weight of pure titanium dioxide and 50 parts by weight of calcined lampblack was blended, mixed with water soluble metal cellulose, and pelleted as described in Example I. The pellets were placed in a graphite crucible with 1000 parts by weight of potassium fluotitanate and were heated for 10 hours at a temperature of 900° C. in an inert atmosphere furnace such as that described in Example I. The resulting salt product was greyish lavender in color. The pellets of titanium dioxide and carbon had become fairly soft and uniformly dark grey in color and were recovered intact from the salt product.

The salt product weighed 1040 parts by weight and on analysis was found to contain 22% titanium. This percentage of titanium in the salt product is equivalent to a gain in 22 parts by weight of titanium contributed by the titanium dioxide and carbon reactants. On the basis of Equation 1, and again assuming 100% completion of the reaction, the theoretical gain in titanium content of the salt product should have been 66 parts by weight. The actual yield, therefore, was 33% of the theoretical amount obtainable.

The ground salt product was leached with a cold 3% solution of hydrochloric acid. The resulting green liquor was treated in exactly the same manner as described in Example I. The two batches of lavender crystals recovered weighed a total of 103 parts by weight.

*Example III*

A mixture of 639 parts by weight of pure titanium monoxide and 120 parts by weight of high purity graphite was blended with water soluble methyl cellulose and pelleted as described in Example I. The titanium monoxide and graphite were both finely divided, having a particle size of minus 325 mesh (Tyler Standard). The pellets were heated with 4800 parts by weight of potassisum fluotitanate for 10 hours at a temperature of 900° C. in an inert atmosphere furnace as described in Example I. The resulting molten salt product was filtered through a porous carbon filter into a carbon mold and was allowed to cool under an inert atmosphere of argon.

The resulting salt cake weighing 4600 parts by weight was analyzed and found to contain 24% titanium, an increase of 4.1% over the amount of titanium initially present in the potassium fluotitanate. Chemical analysis of the product indicated that the titanium content thereof was predominately in the trivalent state. On the basis of Equation 3, the increase in titanium content of the salt cake was equivalent to an actual yield of 59% of that theoretically obtainable. The excess titanium monoxide was recovered on the carbon filter as an insoluble oxycarbide of titanium.

*Example IV*

A mixture of 160 parts by weight of pigment grade titanium dioxide and 72 parts by weight of calcined lampblack were blended and pelleted as in Example I. The resulting pellets were heated with 1600 parts by weight of potassium fluotitanate for 12 hours at a temperature of 950° C. The resulting molten salt product was filtered through a porous carbon disk under an inert argon atmosphere. Insoluble residual carbon, titanium dioxide, titanium carbide and titanium oxyfluoride present in the salt mass were retained on the filter. The clear fused salt filtrate was allowed to cool to room temperature in an inert atmosphere.

The resulting solidified salt cake was ground and a portion thereof analyzed for titanium. The salt product was found to contain 22.8% titanium which, on the basis of the 1460 parts by weight of salt product recovered, represented an increase of 42.3 parts by weight in its titanium content due to the titanium dioxide reactant. This increase in titanium content of the salt product, on the basis of Equation 4, represented an actual yield of 44% of the titanium available from the titanium dioxide reagent.

The ground salt cake was then mixed with 7,700 parts by weight of sodium chloride. The resulting mixture was introduced into an electrolytic cell, melted and electrolyzed under an inert atmosphere to produce titanium metal at the cell cathode.

It is apparent from the foregoing description and examples of our invention that we have developed a novel and useful process for preparing lower valent titanium fluorides by reaction between titanium oxide, carbon and an alkali metal fluotitanate. The lower valent titanium fluorides thus produced are useful for a variety of purposes including commercially important processes for the preparation of titanium metal by electrolytic and thermal procedures.

We claim:

1. The method of producing alkali metal titanium double fluorides in which the titanium has a valence of less than four which comprises forming a mixture of an alkali metal-titanium double fluoride in which the titanium is tetravalent, carbon and a titanium oxide, heating the mixture to a temperature within the range of about 780° to 1150° C. under an atmosphere inert with respect to said reactants, and recovering from the reaction mass at least one resulting alkali metal-titanium double fluoride in which the titanium has a valence of less than four.

2. The method of producing alkali metal titanium double fluorides in which the titanium has a valence of less than four which comprises pelletizing a blend of carbon and a titanium oxide, forming a mixture of said pellets with an alkali metal-titanium double fluoride in which the titanium is tetravalent, heating the mixture to a temperature within the range of about 780° to 1150° C. under an atmosphere inert with respect to said reactants, and recovering from the reaction mass at least one resulting alkali metal-titanium double fluoride in which the titanium has a valence of less than four.

3. The method of producing alkali metal titanium double fluorides in which the titanium has a valence of less than four which comprises forming a mixture of an alkali metal-titanium double fluoride in which the titanium is tetravalent with pellets of a blend of carbon and titanium dioxide, the molar proportion of carbon to titanium dioxide in said pellets being about 3:1 and the molar proportion of titanium dioxide to the alkali metal-titanium double fluoride in said mixture being in excess of 1:3, heating the mixture to a temperature within the range of about 780° to 1150° C. under an atmosphere inert with respect to said reactants, and recovering from the reaction mass at least one resulting alkali metal-titanium double fluoride in which the titanium has a valence of less than four.

4. The method of producing alkali metal titanium double fluorides in which the titanium has a valence of less than four which comprises forming a mixture of an alkali metal-titanium double fluoride in which the titanium is tetravalent with pellets of a blend of carbon and titanium sesquioxide, the molar proportion of carbon to titanium sesquioxide in said pellets being about 5:1 and the molar proportion of titanium sesquioxide to the alkali metal-titanium double fluoride in said mixture being in excess of 1:6, heating the mixture to a temperature within the range of about 780° to 1150° C. under an atmosphere inert with respect to said reactants, and recovering from the reaction mass at least one resulting alkali metal-titanium double fluoride in which the titanium has a valence of less than four.

5. The method of producing alkali metal titanium double fluorides in which the titanium has a valence of less than four which comprises forming a mixture of an alkali metal-titanium double fluoride in which the titanium is tetravalent with pellets of a blend of carbon and titanium monoxide, the molar proportion of carbon to titanium monoxide in said pellets being about 2:1 and the molar proportion of titanium monoxide to alkali metal-titanium double fluoride in said mixture being in excess of 1:3, heating the mixture to a temperature within the range of about 780° to 1150° C. under an atmosphere inert with respect to said reactants, and recovering from the reaction mass at least one resulting alkali metal-titanium double fluoride in which the titanium has a valence of less than four.

6. The method of producing alkali metal titanium double fluorides in which the titanium predominately has a valence of three which comprises forming a mixture of an alkali metal-titanium double fluoride in which the titanium is tetravalent with pellets of carbon and a titanium oxide, heating the mixture to a temperature within the range of about 780° to 900° C. under an atmosphere inert with respect to said reactants, and recovering from the reaction mass at least one resulting alkali metal-titanium double fluoride in which titanium has a valence of three.

7. The method of producing alkali metal titanium double fluorides in which the titanium predominately has a valence of two which comprises forming a mixture of an alkali metal-titanium double fluoride in which the titanium is tetravalent with pellets of a blend of carbon and a titanium oxide, heating the mixture to a temperature within the range of about 900° to 1150° C. under an atmosphere inert with respect to said reactants, and recovering from the reaction mass at least one resulting alkali metal-titanium double fluoride in which titanium has a valence of two.

References Cited in the file of this patent
UNITED STATES PATENTS 2,672,399     Wainer _____ Mar. 16, 1954